United States Patent [19]

Savage, Jr.

[11] 4,275,112

[45] Jun. 23, 1981

[54] SUPPORT FOR DECORATIVE AND COMMUNICATIVE MATERIAL

[75] Inventor: Erle B. Savage, Jr., Wayzata, Minn.

[73] Assignee: Ionic Controls, Inc., Woodbury, Minn.

[21] Appl. No.: 937,410

[22] Filed: Aug. 28, 1978

[51] Int. Cl.[3] .......................... B32B 5/18; B32B 7/06

[52] U.S. Cl. ...................................... 428/310; 156/71; 428/337; 428/522; 428/523

[58] Field of Search ............... 428/310, 315, 337, 345, 428/409, 411, 522, 523; 156/71, 272; 521/143, 918; 204/159.2

[56] References Cited

U.S. PATENT DOCUMENTS

| | | | |
|---|---|---|---|
| 3,540,977 | 11/1970 | Schickedanz | 428/315 |
| 3,857,731 | 12/1974 | Merrill, Jr. et al. | 526/307 |
| 3,995,087 | 11/1976 | Desanzo | 428/315 |
| 4,003,538 | 1/1977 | Frye | 428/213 |
| 4,097,319 | 6/1978 | Shimokawa et al. | 428/315 |

FOREIGN PATENT DOCUMENTS

| | | | |
|---|---|---|---|
| 1220053 | 1/1971 | United Kingdom | 428/315 |
| 1300262 | 12/1972 | United Kingdom | 428/315 |
| 1472403 | 5/1977 | United Kingdom | 428/315 |

*Primary Examiner*—William J. Van Balen

*Attorney, Agent, or Firm*—David A. Roden; G. B. Gehrenbeck

[57] ABSTRACT

A decorative hanging, electrostatically adherent to wall and ceiling surfaces comprises a doubly charged, irradiated and crosslinked insulative plastic foam.

4 Claims, 2 Drawing Figures

SUPPORT FOR DECORATIVE AND COMMUNICATIVE MATERIAL

BACKGROUND OF THE INVENTION

This invention relates to the decorative and communicative arts, and has particular reference to the temporary or semi-permanent application of decorative coverings, pictures, drawings, printed materials, letters of the alphabet and similar matter to walls, ceilings and other supportive substrates without the use of nails, hooks, adhesives, "cling" adhesives or similar bonding agents.

The Prior Art

The prior art, as exemplified for example by U.S. Pat. No. 4,033,538, has made use of self-sticking adhesives for removably adhering articles or article holding devices to supportive wall surfaces. Upon removal of the article or device, particularly after prolonged contact, small residual portions of sticky material remain on the wall surface where they attract and retain dust, causing noticeable disfigurement.

U.S. Pat. No. 3,857,731 discloses a re-usable sheet construction comprising a novel binder material coated on at least one surface of a substrate such as a plastic sheet. Such a construction may be used as an element in the manufacture of articles according to the present invention. Although this patent does include closed-cell urethane foam as one form of substrate, it does not disclose or suggest the specific types of closed-cell foams required in the practice of the present invention and having the specific properties of such materials.

The effect of electrostatic charges in causing temporary clinging of fabrics and films to various surfaces is well known. Such effects have generally been found to be more annoying than desirable, and have been responsible for the development of antistatic coatings and treatments. Under conditions of high humidity, the cling factor is reduced or eliminated.

I have now discovered that electrostatic charges may effectively be utilized in the mounting of photographs, drawings and other sheet or film materials on various surfaces for either semi-permanent or temporary display. The articles are held in place with sufficient strength to resist the forces of gravity, air currents, or other ordinarily encountered removal forces. Surprisingly, support may be achieved and maintained even under conditions of high humidity. Removal, and replacing in another location, are accomplished with no difficulty and without leaving any adhesive or other unsightly residue on the exposed surface.

These and other advantageous results are obtained, in accordance with the principles of my invention, by employing as an intervening support medium between the decorative sheet material and the supporting substrate a thin web of low density plastic foam and which is first electrostatically charged, all as will be further described and illustrated.

SUMMARY OF THE INVENTION

The present invention provides a decorative hanging which is adapted to be attached to a supporting substrate, such as a wall or ceiling, by electrostatic attraction and comprises a decorative or communicative sheet or shape (such as the shape of a numeral or letter of the alphabet) and as a supporting medium therefor, a thin, insulative, smooth-surfaced, minutely cellular plastic web of crosslinked polyalkylene polymer having latent charge retentivity as induced by irradiation crosslinking, having a bulk density of about two pounds per cubic foot, a thickness 1/16 to ½ inch, and a dissipation factor of about 0.0008 to 0.0001, the web having been electrostatically charged.

The present invention also provides a method of hanging decorative sheet material comprising precharging a thin insulative smooth-surfaced minutely cellular plastic web of irradiation crosslinked polyalkylene polymer having a bulk density of about two pounds per cubic foot, a thickness of about 1/16 to ½ inch and a dissipation factor of about 0.0008 to 0.0001, adhering said decorative sheet material to said web, recharging said web, and placing the recharged surface against a supporting substrate.

DETAILED DESCRIPTION

Figure 1:
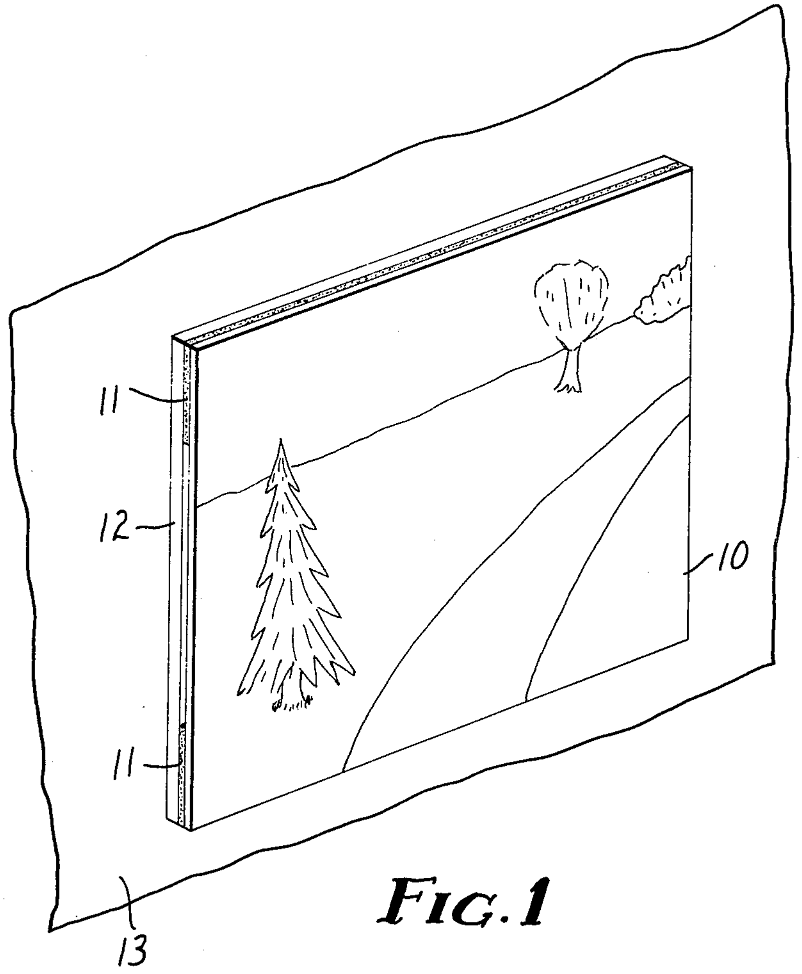
FIG. 1 is a view in perspective showing a photoprint supported on a vertical surface in accordance with the principles of the invention.

In FIG. 1 a photographic print 10 is adhered by top and bottom marginal adhesive mounting strips 11 to a charged plastic foam pad 12 which is electrostatically supported against a vertical wall surface 13.

Figure 2:
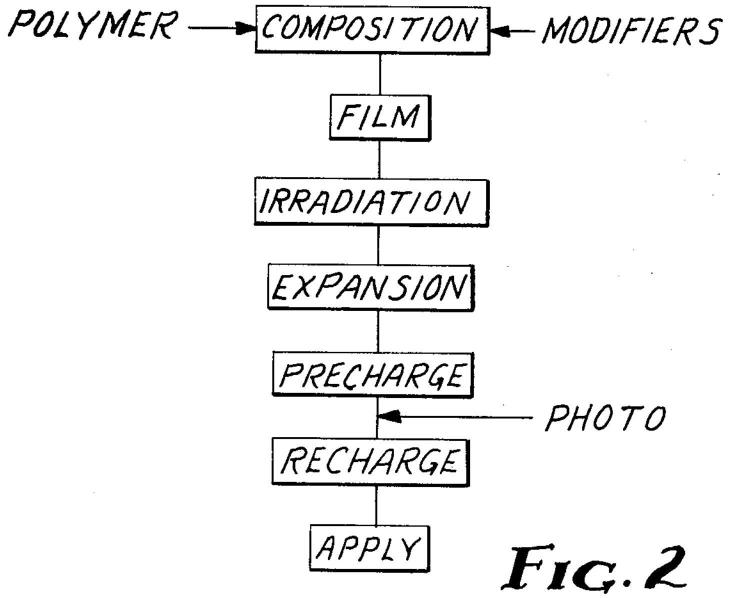
FIG. 2 is a flow diagram indicating a preferred procedure for the preparation and application of my decorative hangings.

Steps involved in preparing the hanging of FIG. 1 are detailed in FIG. 2. The polymer is first compounded with essential modifiers and converted to film form. The film is irradiated to cause crosslinking of the polymer and is heated to induce formation of internal voids and expansion to a pre-charged closed-cell foam. The desired picture or other decorative surfacing is applied to one side of the foam. The pad is then further charged and placed against the desired supportive surface.

The plastic foam web must meet certain requirements in order to provide long term forceful support. A thickness of at least about 1/16 but less than about ½ inch is desirable, the greater thickness being helpful where greater conformability is indicated. A nominal thickness of 3/16 to ¼ inch is presently preferred as combining maximum holding power with ordinarily adequate conformability. It will be apparent that an electrically insulating material is required, and substances such as polyethylene, polypropylene and polystyrene are preferred. Copolymers of monomers primarily comprised of the lower alkylenes and meeting the other stated requirements are useful. The use of polytetrafluorooethylene foam is also contemplated.

The polymeric material in the form of a thin film containing the required heat-decomposable blowing agent is first subjected to electron beam irradiation to cause cross-linking of the polymer. Subsequent heating produces a closed-cell cell foam structure with highly uniform and very minute voids, a smooth surface appearance, and an apparent or bulk density of about two pounds per cubic foot. The dissipation factor measured in accordance with ASTM D150-70 is in the range of 0.0008 to 0.0001. In addition to providing increased heat resistance, it is surprisingly found that the irradiation treatment results in the cross-linked and foamed web having a latent ability to accept and retain for a surprisingly longer period of time than might be expected an induced electrostatic charge.

The cellular web is first given an induced charge well prior to use for its intended purpose, and either before or after applying the decorative sheet material to the web. It is again charged just before being placed against the supporting wall or other substrate. In each instance, charging is easily and quickly accomplished by brief vigorous rubbing of the surface with a hair or wool pad, for example a buffing pad of sheared sheepskin. In some instances recharging by rubbing the pad briskly against the wall surface has been found to be equally effective.

The desired decorative sheet or other graphic material may be applied to the surface of the plastic foam at any time and in any desired manner consistent with the required characteristics of the composite. In some cases electrostatic attraction itself provides adequate anchorage. A solution of rubbery self-tacky adhesive may be first applied to the foam, the sheet, or both, and the two adhered together after the coating has dried. Self-adherent dry adhesive photo mounting film and other analogous products, as illustrated in FIG. 1, are also effective.

Photographic prints are a prime example of decorative sheet material suitable for supporting on a wall, mirror or other substrate in accordance with my invention. Paintings, drawings, and prints on paper, fabric, film, laminates and various other thin sheet materials are other examples. The terms "decorative sheet material" or "decorative hanging" as used herein, also embrace communicative materials, i.e., items designed for conveying messages, ideas or concepts, e.g., numerals, letters of the alphabet, etc.

The following specific example is provided to further illustrate the invention:

EXAMPLE

A thin polyethylene film containing a blowing agent is subjected to electrom beam irradiation and is then heated, producing a, closed cell, unitary cellular foam product having very small closed cells or voids and a generally smooth surface. The thickness of the web is nomimally $\frac{1}{4}$ inch and its bulk density is two pounds per cubic foot. The dissipation factor, measured in accordance with ASTM D150-70, is 0.0002. A polyethylene foam product as thus identified is available at the date of this application from Foamade Industries of Royal Oak, Michigan as "VOLARA" Type E polyethylene foam.

A 3×5 inch segment of the foam pad is precharged by rubbing briskly with a clean wool fabric buff. Strips of print mounting film having a pressure-sensitive adhesive on one side and a reusable adhesive on the other are placed along top and bottom margins and a 3×5 inch photo is adhered to the exposed reusable adhesive surface. The composite is stored for several days in an envelope. It is then removed, the foam is recharged by further buffing, and the foam side of the composite is placed against the clean dry surface of a ceramic tile wall located in a room subjected to frequent periods of high humidity. The composite is strongly attracted to the tile surface and remains attached for several months and until deliberately removed.

I claim:

1. A decorative hanging adapted to be attached to a supporting substrate by electrostatic attraction and comprising a decorative sheet material and, as a supporting medium therefor, a thin, insulative, smooth-surfaced, minutely cellular, closed cell, unitary plastic web of crosslinked polyalkylene polymer having latent charge retentivity as induced by irradiation crosslinking, having a bulk density of about two pounds per cubic foot, a thickness of about 1/16 to $\frac{1}{2}$ inch, and a dissipation factor of about 0.0008 to 0.0001, and said web having been electrostatically charged.

2. Article of claim 1 wherein said polymer is a polyethylene polymer.

3. Article of claim 1 wherein said decorative sheet material is adhered to said plastic web by an intervening self-tacky adhesive.

4. Method of hanging decorative sheet material comprising precharging a thin insulative smooth-surfaced minutely cellular, closed cell, unitary plastic web of irradiation crosslinked polyalkylene polymer having a bulk density of about two pounds per cubic foot, a thickness of about 1/16 to $\frac{1}{2}$ inch and a dissipation factor of about 0.0008 to 0.0001, adhering said decorative sheet material to said web, recharging said web, and placing the recharged surface against a supporting substrate.

* * * * *